United States Patent [19]

Modur et al.

[11] 4,443,177
[45] Apr. 17, 1984

[54] BACK FLUSH INJECTION NOZZLE

[75] Inventors: Bhaskar S. Modur, Canton; Uwe W. Perl, Union Lake; Donald E. Smick, Berkley, all of Mich.

[73] Assignee: Ford Motor Company, Dearborn, Mich.

[21] Appl. No.: 456,066

[22] Filed: Jan. 6, 1983

[51] Int. Cl.³ .......................... B29F 1/03; B29G 3/00
[52] U.S. Cl. .................................... 425/543; 425/225; 425/548; 425/549; 425/564; 425/568
[58] Field of Search .................. 264/39; 425/132, 225, 425/543, 548, 564, 568, 573; 222/148; 239/112, 113, 114, 115, 116, 117, 118

[56] References Cited

U.S. PATENT DOCUMENTS 4,386,899 6/1983 Cook .................................... 425/225

Primary Examiner—Thomas P. Pavelko
Assistant Examiner—Virginia Fischbach
Attorney, Agent, or Firm—Peter D. McDermott; Roger L. May

[57] ABSTRACT

Injection apparatus suitable for supplying in-mold thermoset coating material into a compression molding tool is provided, which injection apparatus comprises a housing (10) the forward end of which comprises an outlet nozzle (11) and an outlet channel (12) extending through the outlet nozzle, the forward terminus of the outlet channel being an outlet port (13). First and second material supply channels (14 and 15) extend within the housing from first and second supply inlet ports (16 and 17) in the housing, respectively, to a single common junction with the outlet channel. A shut-off rod (26) is slideably disposed within the outlet channel, being adapted to provide a sealing closure of the outlet port in a first, forward position and being retractable from the forward position to a second position in the outlet channel rearward of the junction of the material supply channels with the outlet channel. In both the forward and retracted position, the shut-off rod forms a sealing engagement with the outlet channel rearward of the junction of the two material supply channels with the outlet channel. Significantly, the first and second material supply channels are in communication with each other via only a single flow-path, at least when the shut-off rod is in the forward position.

12 Claims, 4 Drawing Figures

BACK FLUSH INJECTION NOZZLE

TECHNICAL FIELD

This invention relates to an injection nozzle apparatus and more particularly relates to an injection nozzle apparatus for injecting in-the-mold thermoset coating material, which provides a back-flush mode of operation for purging the nozzle of such coating material.

BACKGROUND ART

Methods and apparatus are known which provide a coating onto the outer surface of a compression molded article within the molding tool chamber during the molding process. Such coatings, commonly referred to as "in-mold coatings", provide a cosmetically improved surface layer on freshly molded articles where the molded surface otherwise would be aesthetically unacceptable due to molding blemishes caused by porosity, sinks or cracks and the like. Such blemishes may result from uneven plastic flow or shrinkage during cooling. Automotive vehicle body exterior panels are exemplary of compression molded parts requiring a surface quality improved over that provided by compression molding alone.

The in-mold coating process typically comprises first molding a base portion of the article in the cavity of a pair of relatively moveable die members of a die molding set, the base portion of the article is allowed to at least partially cure, after which a skin-forming coating material, i.e., the in-mold coating material, is injected onto that surface of such base portion which is to be improved. The base portion can be mechanically or hydraulically held in place against one of the die members and the second die member allowed to separate to provide a partial opening of the mold either prior to or simultaneously with injection of the in-mold coating material. Pressure is then re-applied to close the die members so as to distribute the surface forming in-mold coating material substantially uniformly over the surface of the base portion and thereby to substantially fill any porosity, sinks, cracks and like imperfections. Exemplary of the above, U.S. Pat. No. 4,082,486 discloses apparatus for providing an in-mold coating to a compression molded article during the molding process.

Injection devices are known for injection of the in-mold coating material into the molding cavity. Typically, the die members are opened slightly for injection of the coating material. Alternatively, the coating material can be injected into a precharge chamber which is opened within one die member and which is in communication with the molding cavity. Subsequently the coating material is displaced under pressure into the molding cavity without opening the die members except to the extent necessary to accommodate the added volume of the coating material. This later alternative is illustrated in aforementioned U.S. Pat. No. 4,082,486. In either case, a suitable injector device is required to deliver the liquid thermosetting resin coating material from a remote supply source. One suitable injector device, shown in aforementioned U.S. Pat. No. 4,082,486, is mounted on one die member and comprises a cylindrical housing. A feeder tube which is mounted within the housing has a cylindrical passage that extends axially from a supply port, which is adapted to be connected to a source of coating material, to a nozzle at the opening into the die member. A static mixer is provided within the cylindrical passage to mix the two components of the in-mold coating material. A conically formed head at the end of the feeder tube is moved forward to engage and close-off the nozzle opening into the die member. In such forward position, the end of the feeder tube is in sealing connection with the nozzle. The feeder tube is retracted away from the nozzle to open same and permit coating material to flow into the molding cavity (or precharge chamber).

The material employed for in-mold coatings typically comprises liquid thermosetting resin systems. These thermosetting resin systems will react and thus harden within the injector device if not quickly replaced by fresh resin or purged by solvent, for example methylene chloride, or by other means. During periods of active processing, the resin in the feeder channel is constantly replaced by fresh coating material. Prior to periods of inactivity, however, the coating material must be purged from the injector device to avoid clogging and damaging the injector device. The injector device typically is bolted to a die member and is not easily dismantled. Accordingly, to purge the injector device, solvent flush is fed into the injector device to flow through the injector nozzel opening into the molding cavity. It is necessary to collect the solvent flush as it exits into the molding cavity. This procedure is difficult and impractical and typically results in considerable splashing of resin-laden solvent into the molding cavity, from where it then must be cleaned, and also onto the operator and the surrounding areas.

The prior art of valve design teaches injection valves and related devices suitable for a variety of operations, none of which, however, meets the objectives of the present invention. U.S. Pat. No. 3,985,300 describes a self-purging injection valve adapted to inject additives through a central injection barrel into apparatus used in polymerization systems, for example into an extruder barrel or a polymerization vessel. A supply port feeds each of two channels through the central injection barrel. The channels are concentric, one being exterior and one interior a valve stem which is slideably mounted within the injection barrel. In a first position, the valve stem permits flow in the same direction through each of the two channels through an injection port into the polymerization system. In a second position the valve stem sealingly engages and so closes the injection port. This permits flow of purging fluid into and through one channel and back out the second channel to a purging waste port. The purging waste port can be closed during normal operation. The material supply channels communicate with each other at two locations, a first near where the valve stem forms a sealing engagement with the injection port, and a second at the supply port at the opposite end of the valve stem near the by means of the valve stem. Such design is ill-suited for use in in-mold coating application in view of the temperature-dependent, thermoset nature of in-mold coating material since, for example, no cooling means is provided. It appears unlikely that adequate cooling means could be provided to cool the supply channel which extends axially through the interior of the valve stem.

Other valves of various functions are known which likewise fail to meet the objectives of the present invention. In U.S. Pat. No. 2,283,762 a paint spray device is taught which provides two parallel tubes, a first for paint and a second for pressurized air. The spray nozzle, but not the paint supply tube, can be purged using the pressurized air. Purged material exits at the nozzle. U.S.

Pat. No. 3,733,156 teaches a valve adapted to provide flow of material in alternating fashion from one only of a pair of screw-injection barrels. U.S. Pat. No. 3,752,298 provides a mixing head comprising a mixing chamber, a spray nozzle and a valve adapted to close a pair of lines feeding reactive additive plastics into the mixing chamber and to open separate lines to admit cleaning liquid. The material supply lines are not purged. U.S. Pat. No. 3,947,117 teaches a valve adapted to injecting into a mold a strand of a first plastic of ring-shaped cross section enclosing a strand of a second plastic. U.S. Pat. No. 4,260,348 teaches a water-cooled spruce bushing for an injection molding machine, which bushing has a central passageway for the flow of plastic from the nozzle of the machine to the mold.

It is an object of the present invention to provide an injection device for intermittently feeding in-mold coating material to a compression molding tool, which device can be mounted to a die member. It is a particular object of the invention to eliminate the need for purging coating material into the molding cavity. Specifically, it is an object to provide such a device which can routinely be totally purged of in-mold coating material to a remotely located collection means.

These and other objects and advantages of the present invention will be apparent from the following detailed description and drawings.

DISCLOSURE OF THE INVENTION

According to the present invention, injection apparatus is provided which is adapted to be mounted at an inlet port on one die member of a pair of relatively moveable die members which together form a molding cavity. The injection apparatus is adapted to supply thermosetting in-mold coating material into the molding cavity to coat the surface of a compression molded article within the molding cavity during the molding process. The injection apparatus of the invention comprises:

- a housing, the forward end of which comprises an outlet nozzle, an outlet channel extending through the outlet nozzle and the forward terminus of the outlet channel forming an outlet port;
- first and second material supply channels, each extending within the housing from first and second supply inlet ports in the housing, respectively, to a single common junction with the outlet channel; and
- a shut-off rod slideably disposed within the outlet channel, being adapted to provide a sealing closure of the outlet port in a first, forward position and being retractable from the forward position to a second position within the outlet channel rearward of the junction of the material supply channels with the outlet channel and, in both the forward and retracted position, forming a sealing engagement with the outlet channel rearward of the junction of the material supply channels with the outlet channel; the first and second material supply channels being in communication with each other via a single flow-path when the shut-off rod is in the forward position.

In addition, it is preferred that the injection apparatus provide cooling means such that the in-mold coating material which is within the injection device is maintained at a sufficiently low temperature to substantially retard the rate of cure of such material during normal molding operations. That is, since the rate of cure of in-mold coating material increases with temperature, and since the injection apparatus would otherwise become heated by contact with the compression molding die member to which the injection apparatus is mounted, such cooling means can increase the allowable residence time of the coating material within the injection apparatus.

According to one preferred embodiment of the invention, the aforesaid in-mold coating material injection apparatus comprises:

- a housing comprising an outlet nozzle at its forward end, an outlet channel extending through the outlet nozzle, the forward terminus of the outlet channel being an outlet port, a tubular section extending axially rearward of the outlet nozzle, the forward end of which tubular section is sealingly attached to the outlet nozzle, and a mounting plate sealingly attached to the rearward end of the tubular section, the mounting plate being adapted to mount the injection apparatus to a die member;
- first and second material supply channels, each extending within the housing from first and second supply inlet ports in the aforesaid mounting plate, respectively, to a single common junction with the outlet channel within the outlet nozzle;
- a tubular member extending the outlet channel within the housing axially rearward through the mounting plate, being sealingly attached at its forward end to the outlet nozzle at the rearward terminus of the outlet channel and being sealingly attached at its other end to the mounting plate; and
- a shut-off rod slidably disposed within the outlet channel, being adapted to provide a sealing closure of the outlet port in a first, forward position and being retractable to a second position within the outlet channel rearward of the junction of the material supply channels with the outlet channel and, in both the forward and retracted position, forming a sealing engagement with the outlet channel rearward of the junction of the material supply channels with the outlet channel;
- wherein the first and second material supply channels communicate via a single flow-path when the shut-off rod is in the forward position; and
- cooling means effective to substantially cool the in-mold coating material within the housing.

It will be understood from the disclosure which follows to be an important aspect of the invention, that the material supply channels are in communication with each other via one, but only one, flow-path when the shut-off rod is in the forward position. They are not in communication with the outlet port when the shut-off rod is in the closed (forward) position, due to the sealing engagement which the shut-off rod forms with the outlet port. The material supply channels are not in communications with the rearward terminus of the outlet channel since the shut-off rod maintains at all times a sealing engagement with all or a portion of the outlet channel rearward of the junction of the material supply channels with the outlet channel.

Other features and advantages of this invention will become more apparent from the following detailed description of preferred embodiments and best mode of the invention taken with the drawings illustrating same.

DETAILED DESCRIPTION

Figure 1:
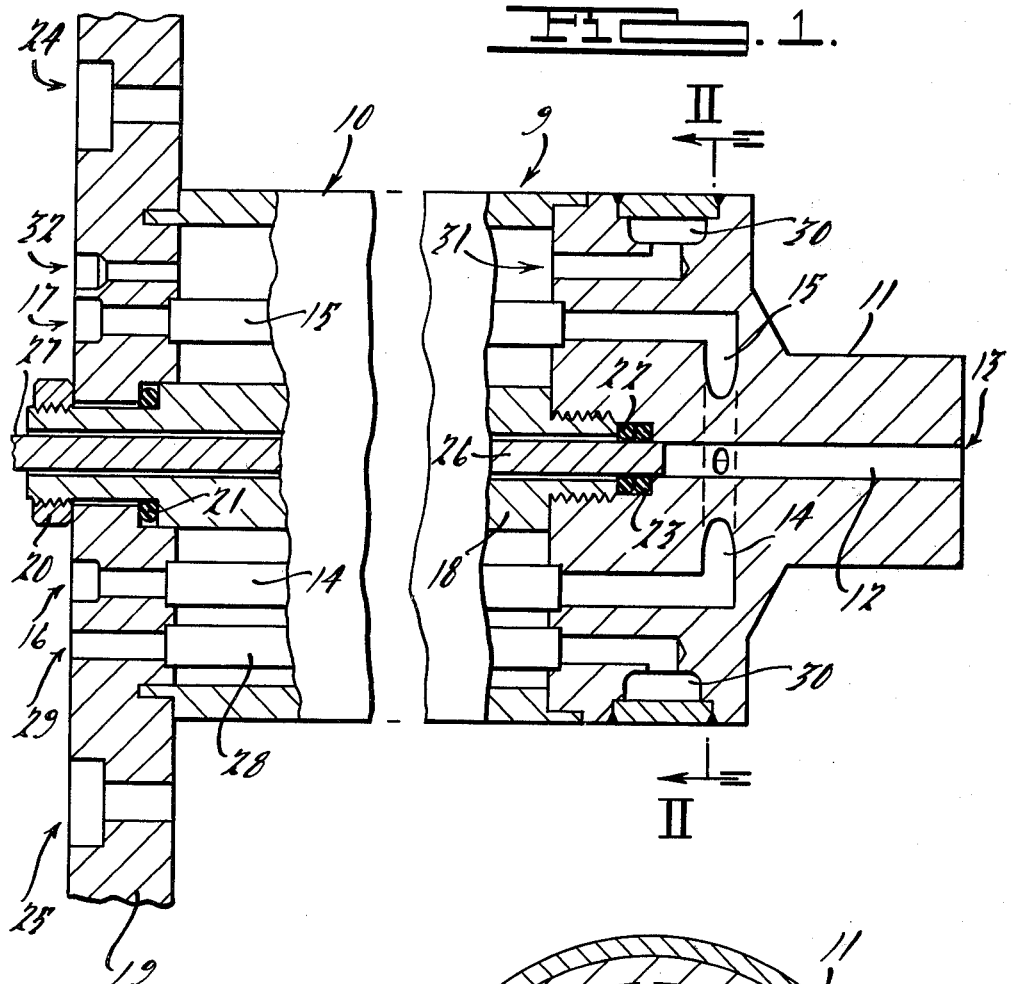
FIG. 1 is a perspective view, partially broken away, of the back flush injection nozzle according to a preferred embodiment of the present invention.

Referring to the drawings, FIG. 1 illustrates injection apparatus according to a preferred embodiment of the invention. Housing 9 comprises metal tubular section 10, shown for illustration purposes partially broken away and discontinuous in the center. The forward end of the housing is formed by outlet nozzle 11 shown in cross-section. Preferably, the tubular section of the housing sealingly engages the outlet nozzle, such as by threaded attachment thereto. Outlet channel 12 extends axially rearward through the outlet nozzle from a forward terminus 13, the forward terminus being an outlet port. First and second material supply channels 14 and 15 extend axially within the housing from first and second supply inlet ports 16 and 17, respectively, to a single, common junction with the outlet channel within the outlet nozzle. A tube or conduit 18 extends the outlet channel within the housing axially rearward of the outlet nozzle. The conduit forms a sealing attachment at the rearward terminus of the outlet nozzle and a second sealing attachment where it exits the housing through mounting plate 19. Use of such conduit, although not necessary to the invention, is preferred in view of the added strength and structural stability it provides to the injection apparatus. The sealing attachment of the conduit to the outlet nozzle and to the mounting plate can be, for example, by threaded attachment with O-rings or by other suitable means known to the skilled of the art. In the embodiment depicted in FIG. 1, a tightening nut 20 and O-rings 21 22 and 23 are employed in forming the aforesaid sealing attachments. Alternative sealing means are known to the skilled of the art and can be used in lieu of O-rings. Thus, for example, Teflon (trademark) packings can be employed, such as in lieu of O-rings 22 and 23. Teflon (trademark) packings are preferred for use in conjunction with solvents such as methylene chloride.

Typically, the injection apparatus of the invention, such as that depicted in FIG. 1, would be mounted at an inlet port on one die member of a pair of relatively moveable die members which together form a molding cavity. Typically a suitable cavity would be provided in the die member to receive the injection apparatus. In the injection apparatus of FIG. 1, the mounting plate provides bolt holes 24 and 25 by which the injection apparatus can be mounted to the die member. Of course, any suitable number of bolts or any suitable alternative mounting method can be employed.

Referring further to FIG. 1, shut-off rod 26 is shown slideably mounted within outlet channel 12. In the normal operating mode of the injection apparatus of the invention, the shut-off rod is retracted and the termosetting in-mold coating material is metered through the injection apparatus into the inlet port of the die member to which the injection nozzle is mounted. When the proper amount of material has been fed into the mold cavity, the shut-off rod is moved forward to sealingly engage and thereby close the outlet port of the injection nozzle. FIG. 1 illustrates the injection position, in which in-mold coating materials may be injected through the material supply channels to the outlet channel and thence through outlet port 13 into the die mold cavity. A sealing engagement is maintained between the shut-off rod and the outlet channel by O-rings 22 and 23. It is not necessary that the shut-off rod maintain a sealing engagement with the outlet channel rearward of that point.

It will be apparent to the skilled of the art in view of the present disclosure, that it will be highly advantageous if the outlet channel is self-cleaning. This is especially true if the injection device is used to deliver thermosetting resins. Such self-cleaning is most preferably achieved by employing a shut-off rod which is machined to close tolerance with the outlet channel forward of the O-rings 22, 23 such that a sealing engagement exists along the entire portion of the outlet channel forward of that point. If the outlet channel is of uniform cross-section from the point of such rearward sealing engagement to the outlet port and the shut-off rod is of constant and uniform cross-section, for example a round outlet channel and a round shut-off rod, wherein the outlet channel provides sufficiently small clearance for the shut-off rod, for example less than about 0.0005 in., then upon moving the shut-off rod into the forward position to sealingly close the outlet port, the sealing engagement of the shut-off rod with the outlet channel will be maintained and will travel forward without interruption (other than at the junction of the material supply channels with the outlet channel) to the outward edge of the outlet port. In this way, the injection apparatus is self cleaning in that the shut-off rod will evacuate all in-mold coating material in front of it as it is pushed forward to the closed position. That is, as the shut-off rod is pushed forward to (and perhaps through) the outlet port, the inner surface of the outlet channel is wiped clean by the advancing shut-off rod and all coating material formerly within the outlet channel is pushed by the shut-off rod through the outlet port. It will be apparent, as noted above, that in all cases a sealing engagement must be maintained at all times between the shut-off rod and the outlet channel rearward of the intersection of the supply channels with the outlet channel.

In the closed position the shut-off rod may either be flush with the outlet port 13 or may extend forward thereof, depending upon the particular application in which the injection apparatus is to be employed.

The shut-off rod can be actuated in any suitable manner, of which several are known to the skilled of the art. Thus, for example, the shut-off rod can be hydraulically actuated or pneumatically actuated or the like. To this end, the rearward portion 27 of the shut-off rod preferably extends some distance past mounting plate 19 for suitable connection to an hydraulic or pnuematic cylinder for operation according to methods well known to the skilled of the art.

The injection apparatus of FIG. 1 further comprises means for cooling the in-mold coating material within the housing. Water supply conduit 28 extends from water inlet 29 into the outlet nozzle and there communicates with an annular channel 30 encircling the outlet nozzle. Water exits the annular ring via water flow port 31 into the main body of the housing. Water exits the housing via water outlet port 32. It is a significant advantage of the present invention that in normal operation the in-mold coating material can be cooled by exposure to cooling water of each of the two material supply channels, rather than by exposure of a single, larger material supply channel. Alternate cooling means will be apparent to the skilled of the art in view of the present disclosure.

In view of the high temperatures normally involved in compression molding and similar applications for which the present invention is suited, it is generally preferred that all components of the injection apparatus described above comprise suitable metal such as machine steel or the like. Alternate materials will be apparent to the skilled of the art in view of the present disclosure and, in particular, it will be apparent that non-metal components may be useful in certain applications involving lower temperatures and pressures etc. Where metal components are employed, for example, flow channels within the outlet nozzle, including for example, the material supply channels, the outlet channel and the annular cavity for the flow of cooling water and other channels as may be required, can be provided by machining the outlet nozzle according to methods well known to the skilled of the art.

Figure 2:
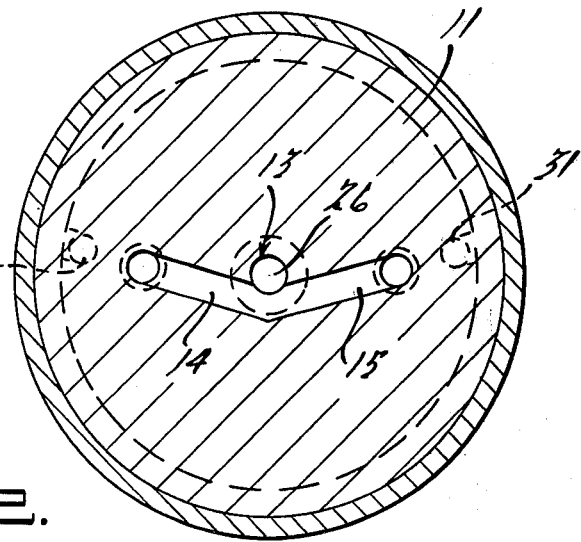
FIG. 2 is a cross-sectional view of the back flush injection nozzle of FIG. 1 taken through line 2—2 in FIG. 1, showing the intersection of the two material supply channels with the outlet channel extending through the outlet nozzle.

Obviously, one advantage of the invention not provided by conventional injection devices having only a single material supply channel is enhanced material flow into the molding tool provided by the additional, second material supply channel. It is a significant further advantage, however, as noted above, that in addition to the normal operating mode, the injection apparatus of the present invention provides a second, "back-flush" operating mode by which in-mold coating material or other reactive materials used in the injection device can be purged from the injection apparatus. This mode is employed, for example, prior to any lengthy period during which coating material would otherwise remain static and harden in the injection nozzle. To provide this aspect of the invention, the two material supply channels are in communication with each other not only when each is supplying in-mold coating material to the central outlet channel, but also when the shut-off rod in the forward position sealingly engaging the outlet channel and closing the outlet port. Further in this regard, according to a highly significant aspect of the present invention, material supply channels 14 and 15 extend to a single common junction with the outlet channel 12. In particular, the junction is such that the two material supply channels communicate with each other via only a single flow-path when the shut-off rod is in the forward position. Thus, as seen in FIG. 2, even with the shut-off rod was in the forward position the material supply channels would still be in communication with each other and would be in communication via only a single flow-path. In normal operation, in-mold coating material is forced through each of the two material supply channels into the outlet channel and thence through the outlet port into the mold cavity. In the back flush mode, however, the shut-off rod is in the forward position. Suitable purging material such as a solvent flush, for example methylene chloride, is pumped into the supply port of one of the two material supply channels. The solvent flush flows in the normal direction through the first material supply channel to its junction with the outlet channel where it necessarily flows into the second material supply channel. The purging material then flows into and through the second material supply channel, in a rearward direction (i.e., opposite that during normal operation), and finally exits from the supply port of the second material supply channel. Material forced through one material supply channel is prevented from escaping into the outlet channel by the sealing engagement between the shut-off rod and the outlet channel. Thus, the second material supply channel becomes an exit path for solvent flush or other purging material fed into the first material supply channel. For reasons discussed above, it can be seen that a significant advantage is provided in the ability to purge the in-mold coating material and solvent flush to a convenient remotely located collection site, rather than into the molding tool where the purge material would be collected into an open pail or the like held at the injection point inside the molding cavity.

Regarding the communication between the first and second material supply channels in such back-flush mode, particular advantages inhere in a unique feature of the present invention, specifically, the single path of flow by which the first and second material supply channels are in communication with each other. It has been found that where multiple flow paths are provided, solvent flush material can follow the path(s) of least resistance and thereby leave stagnent material in the alternate, i.e. un-purged path(s). That is, where multiple paths are provided by which the solvent flush or other purging material could pass from the first to the second material supply channels, the solvent flush in some instances clears one or more but less than all such paths and thereafter follows the path of least resistance through such cleared flow paths leaving one or more other flow paths clogged with in-mold coating material. The in-mold coating material remaining in the injection apparatus often would not be detected and would harden therein. The injection device would then fail to function properly until cleaned, if possible, and in some instances may be irreparably damaged.

Thus, for example, if an annular recess were provided in the shut-off rod at the junction of the material supply channels with the outlet channel, the solvent flush could flow from one material supply channel to the other through such annular recess either over or under the shut-off rod. While both these two alternate flow paths might be cleared, in some instances one only would be cleared and the other left filled with stagnant in-mold coating material. Such stagnant in-mold coating material remaining within the injection apparatus would harden and cause blockages. That is, the solvent flush might clear one flow path and thereafter follow that path of least resistance and so fail to clear the second flow path. In contrast, in the injection apparatus of the present invention, since the two material supply channels are in communication via a single flow-path, the possibility is eliminated of stagnant coating material in one or more of multiple flow paths. Additionally, in preferred embodiments of the invention described above, the single flow-path feature of the invention is further advantageous in that the in-mold coating material first entering the apparatus is first to be forced through and replaced by fresh material during use in the normal operating mode. In this regard, the injection apparatus of FIGS. 1 and 2 comprises an outlet nozzle according to a most preferred embodiment of the invention. Specifically, the outlet nozzle comprises two substantially symmetrical material supply channels. For each, a first portion of the material supply channel extends substantially parallel to the outlet channel from the rearward surface of the outlet nozzle to an intersection with a second portion of the material supply channel. Such first portion of the material supply channel can be drilled or otherwise bored into the body of the outlet nozzle from the rearward surface thereof. The second portion of the first material supply channel extends substantially perpendicularly from its intersection with the end of the first portion to a junction at the outlet channel with the second portion of the other material supply channel. The second portion of the first material supply channel and that of the second material supply channel intersect at the outlet channel preferably at an obtuse angle, most preferably less than 180°. Such intersection overlaps the central outlet channel of the outlet nozzle and is formed from the above-described single, common junction of the first and second material supply channels with the outlet channel. Such intersection necessarily overlaps the central outlet channel only in part, such that the first material supply channel remains in communication with the second material supply channel when the shut-off rod is in the forward position in the outlet channel, in which it "fills" the outlet channel and, so, that portion of such intersection which overlaps, (i.e. is common with) the outlet channel. The second portion of the material supply channel can be drilled or otherwise bored into the body of the outlet nozzle in a line which intersects the end of the aforesaid first portion and the junction with the outlet channel. Subsequently, that portion of such drilled hole which is outward of the intersection with the end of the aforesaid first portion can be plugged or filled according to any of several suitable methods known to the skilled of the art.

According to another advantageous embodiment of the present invention, the injection apparatus is adapted for use in an automatic purging operation. According to this preferred embodiment, the injection device further comprises a two-port by-pass valve adapted, in a first mode, to supply material simultaneously to both of the aforesaid supply inlet ports. In a second mode, the by-pass valve supplies solvent flush or other material into one material inlet port only and permits that material to exit from the second material inlet port. The by-pass valve can be used to direct the exiting material to a remote collection site in the case of solvent flush or, in an alternate use, can direct the exiting material for recirculation through the injection device.

Figure 3A:
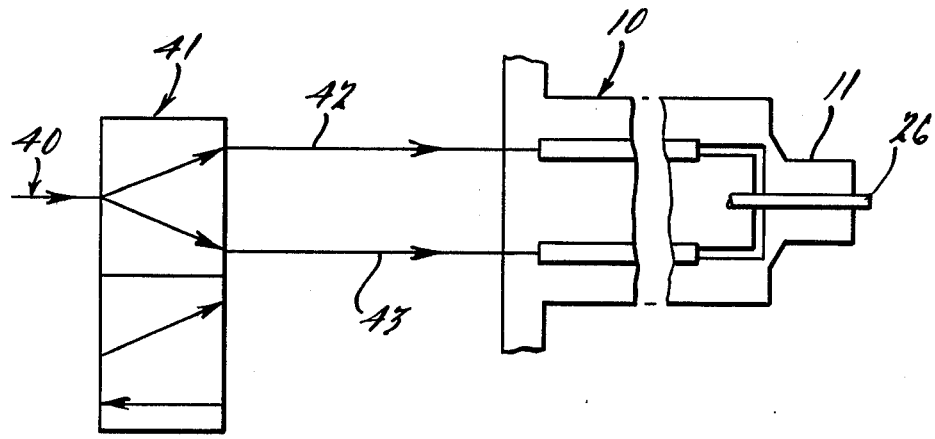
FIG. 3 is a schematic illustration in two parts, wherein FIG. 3A schematically illustrates the injection apparatus of FIGS. 1 and 2 further comprising a two port by-pass valve in the normal operating mode for supply of in-mold coating material through each of the two material supply channels.
FIG. 3B schematically illustrates the injection apparatus wherein the two port by-pass valve is in the purge, that is, the back-flush mode.
Figure 3B:
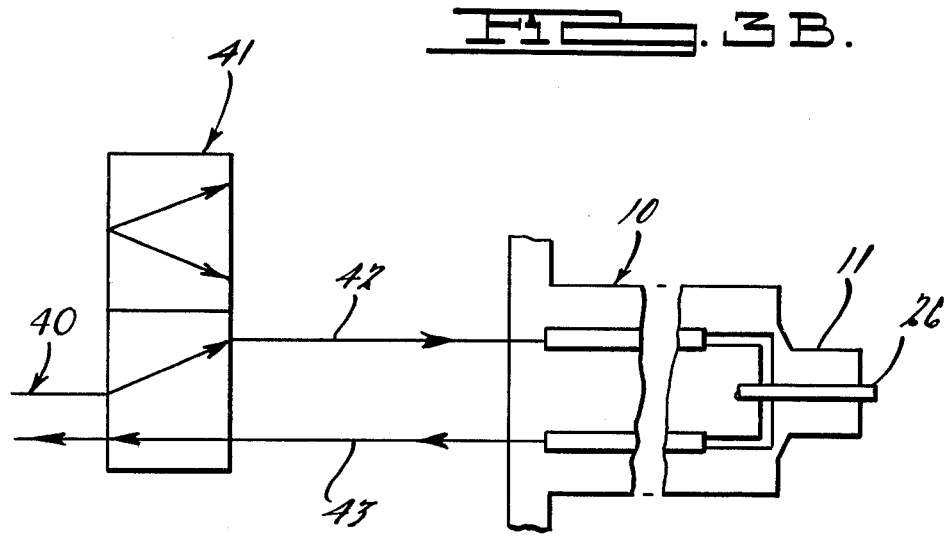

In FIG. 3, injection apparatus according to the invention comprising such two port by-pass valve is schematically illustrated. FIG. 3A illustrates the normal operating mode of the injection apparatus. Previously mixed in-mold coating material is fed via line 40 into the two port by-pass valve 41. The material is divided by the by-pass valve and exits therefrom into material supply conduits 42 and 43, which communicate with the first and second material supply inlet ports (16 and 17, shown in FIG. 1), respectively. In this mode of operation, in-mold coating material travels through both material supply channels in the same direction to the outlet nozzle and thereafter into the mold cavity FIG. 3B illustrates the back-flush mode of operation, wherein solvent flush or other purging material enters the by-pass valve via line 40. The solvent flush travels through material supply conduit 42 to the first material supply channel. In this mode, the shut-off rod is in the forward position which seals the outlet port of the outlet nozzle. Accordingly, the solvent flush is forced to flow from the first material supply channel into the second material supply channel. Thus, the second material supply channel serves as an exit path for the solvent flush. The solvent flush is carried through the second material supply channel out of the injection apparatus through material supply conduit 43 to a remote collection site. Since only a single flow-path is available between the first and second material supply channels within the outlet nozzle, the solvent flush will follow that flow-path and will completely clear the injection apparatus of in-mold coating material. That is, substantially no in-mold coating material will remain within the injection apparatus to harden and interfere with future use thereof.

It will be well within the ability of those skilled in the art to employ additional devices and equipment in conjunction with the injection apparatus of the invention, for example, one or more static mixers in the material supply channels or in the material supply conduits or prior thereto, or other devices or equipment.

While the invention has been shown and described according to preferred embodiments, it will be clear to those skilled in the arts to which it pertains that changes and modifications can be made thereto without departing from the scope of the invention.

INDUSTRIAL APPLICABILITY

It will be obvious from the foregoing that this invention has industrial applicability to molding operations and especially to in-mold coating operations in conjunction with compression molding. It provides a back-flush injection device adapted to feed material to the molding cavity and, in a second mode of operation, adapted to be purged to a collection site remote from the molding cavity.

We claim:

1. Injection apparatus adapted to supply thermosetting in-mold coating material into a molding cavity, which injection apparatus comprises:

a housing, the forward end of which comprises an outlet nozzle, an outlet channel extending through the outlet nozzle and the forward terminus of said outlet channel forming an outlet port;

first and second material supply channels, each extending within said housing from first and second supply inlet ports in said housing, respectively, to a single common junction with said outlet channel; and a shut-off rod slideably disposed within said outlet channel, being adapted to provide a sealing closure of said outlet port in a first, forward position and being retractable from the forward position to a second position in the outlet channel rearward of said junction of said material supply channels with said outlet channel and, in both the forward and retracted position, forming a sealing engagement with the outlet channel rearward of said junction of said material supply channels with said outlet channel; said first and second material supply channels being in communication with each other via a single flow-path when said shut-off rod is in said forward position.

2. The injection apparatus of claim 1, wherein said housing further comprises a mounting plate adapted to mount said injection apparatus to a die member, and a tubular housing section, the forward end of which tubular housing section is sealingly attached to said outlet nozzle and the rearward end of which tubular housing section is sealingly attached to said mounting plate.

3. The injection apparatus of claim 1 further comprising means for cooling said in-mold coating material within said housing.

4. The injection apparatus of claim 3, wherein said cooling means comprises a water inlet port in said housing; a conduit extending axially within said housing from said water inlet port to a water channel within said outlet nozzle; and a water outlet port providing an outlet from said housing.

5. The injection apparatus of claim 3 further comprising a tubular member extending said outlet channel within said housing axially rearward through said mounting plate, said tubular member being sealingly attached at one end to said outlet nozzle at the rearward terminus of said outlet channel and being sealingly attached at the other end to said mounting plate.

6. The injection apparatus of claim 1, wherein said two material supply channels are substantially symmetrical within said outlet nozzle and each comprises a first portion and a second portion therein; each said first portion extending from the rearward surface of the outlet nozzle substantially parallel the outlet channel to an intersection with said second portion extending, substantially perpendicularly to said first section, to said single, common junction with said outlet channel.

7. The injection apparatus of claim 6, wherein said second portion of said first material supply channel and said second portion of said second material supply channel intersect at an obtuse angle less than 180°.

8. The injection apparatus of claim 1 further comprising a two port by-pass valve; a first material supply conduit from a first outlet port of said by-pass valve to the first of said supply inlet ports in said housing; and a second material supply conduit from the second outlet port of said by-pass valve to the second supply inlet port in said housing.

9. Injection apparatus adapted to be mounted at an inlet port on one die member of a pair of relatively moveable die members which together form a molding cavity, said injection apparatus being adapted to supply thermosetting in-mold coating material into said molding cavity during the molding process, said injection apparatus comprising:
a housing comprising (i) an outlet nozzle at a forward end, an outlet channel extending through said outlet nozzle, the forward terminus of said outlet channel being an outlet port, (ii) a tubular housing section, the forward end of which tubular housing section is sealingly attached to said outlet nozzle, and (iii) a mounting plate sealingly attached to the rearward end of said tubular housing section, said mounting plate being adapted to mount said injection apparatus to a die member;
first and second material supply channels, each extending within said housing from first and second supply inlet ports in said mounting plate, respectively, to a single common junction with said outlet channel within said outlet nozzle;
a tubular member extending said outlet channel within said housing axially rearward through said mounting plate, being sealingly attached at one end to said outlet nozzle at the rearward terminus of said outlet channel and being sealingly attached at the other end to said mounting plate;
a shut-off rod slideably disposed within the outlet channel, being adapted to provide a sealing closure of the outlet port in a first, forward position and being retractable to a second position within the outlet channel rearward of said junction of said material supply channels with said outlet channel and, in both the forward and retracted position, forming a sealing engagement with the outlet channel rearward of said junction of said material supply channels with said outlet channel; and
cooling means effective to substantially cool the in-mold coating material within said housing, which cooling means comprises a water inlet port in said housing, a conduit extending axially within said housing from said water inlet port to a water channel within said outlet nozzle and a water outlet port providing an outlet from said housing.

10. The injection apparatus of claim 9, wherein said two material supply channels are substantially symmetrical within said outlet nozzle and each comprises a first portion and a second portion therein; each said first portion extending from the rearward surface of the outlet nozzle substantially parallel the outlet channel to an intersection with said second portion extending, substantially perpendicularly to said first section, to said single, common junction with said outlet channel.

11. The injection apparatus of claim 10, wherein said second portion of said first material supply channel and said second portion of said second material supply channel intersect at an obtuse angle less than 180°.

12. The injection apparatus of claim 9 further comprising a two port by-pass valve; a first material supply conduit from a first outlet port of said by-pass valve to the first of said supply inlet ports in said housing; and a second material supply conduit from the second outlet port of said by-pass valve to the second supply inlet port in said housing.

* * * * *